United States Patent
Muttik et al.

(10) Patent No.: US 7,739,100 B1
(45) Date of Patent: Jun. 15, 2010

(54) EMULATION SYSTEM, METHOD AND COMPUTER PROGRAM PRODUCT FOR MALWARE DETECTION BY BACK-STEPPING IN PROGRAM CODE

(75) Inventors: Igor G. Muttik, Berkhamsted (GB); Ivan Teblyashkin, Aylesbury (GB)

(73) Assignee: McAfee, Inc., Santa Clara, CA (US)

(*) Notice: Subject to any disclaimer, the term of this patent is extended or adjusted under 35 U.S.C. 154(b) by 426 days.

(21) Appl. No.: 11/253,094

(22) Filed: Oct. 18, 2005

(51) Int. Cl.
*G06F 9/455* (2006.01)
*G06F 11/00* (2006.01)
*G06F 12/14* (2006.01)
*G06F 12/16* (2006.01)
*G08B 23/00* (2006.01)

(52) U.S. Cl. ............... 703/26; 726/22; 726/23; 726/24; 726/25

(58) Field of Classification Search ............... 703/26; 726/22–25
See application file for complete search history.

(56) References Cited

U.S. PATENT DOCUMENTS 5,964,889 A * 10/1999 Nachenberg ............ 714/25

OTHER PUBLICATIONS

Virex Olympus Scan Engine—4130b2, release date Dec. 5, 2000 http://www.versiontracker.com/dyn/moreinfo/macos/9366.

* cited by examiner

*Primary Examiner*—Kamini S Shah
*Assistant Examiner*—Saif A Alhija
(74) *Attorney, Agent, or Firm*—Zilka-Kotab, PC

(57) ABSTRACT

A system, method, and computer program product are provided for detecting malware. In use, a search is conducted for known elements of computer code. Upon the detection of at least one known element of computer code, various operations are performed. In particular, the present technique steps back in the computer code, and emulates the computer code. Such emulation and stepping are performed for detecting malware.

21 Claims, 5 Drawing Sheets

EMULATION SYSTEM, METHOD AND COMPUTER PROGRAM PRODUCT FOR MALWARE DETECTION BY BACK-STEPPING IN PROGRAM CODE

FIELD OF THE INVENTION

The present invention relates to computer security software, and more particularly to identifying malware utilizing emulation.

BACKGROUND

Due to the ever-increasing amounts of malware computer systems must be protected against, security programs have become a growing necessity. Specifically, malware such as viruses, worms, Trojan horses, spyware, etc. is constantly being developed by attackers to intrude and sometimes even destroy computer systems. For example, the results of malware has ranged from mild interference with a program, such as the display of an unwanted political message in a dialog box, to the complete destruction of data on a hard drive, and even the theft of personal information.

Many security programs have been created in order to provide the protection required by modern computer systems. For example, anti-virus software may be used to reliably, generically and proactively detect malware. One common approach employed by anti-virus software is to conduct a binary search involving strings and/or checksums. However, this method is not very suitable for generically detecting programs written in high-level languages. High-level languages programs, even if simply recompiled with other compiler options, may necessitate other malware detection techniques.

Another known malware detection algorithm searches for malware generically by utilizing behavior blocking. In use, anti-virus software employing this technique triggers a response as a result of some actions (or sequences of actions) intercepted at runtime. One disadvantage associated with this approach is it will not necessarily work before computer code is executed on a target system. Therefore, this type of anti-virus software is not ideally suited for use with a server or mail scanner.

Yet another malware detection technique that addresses some or all of the foregoing deficiencies involves computer code emulation. Such solution determines behavior of computer code before executing it. Traditionally, computer code associated with a program is fully emulated in a simulated environment. To this end, one can execute the computer code inside an emulator and observe any effects, while the computer code is insulated from the computer system.

This solution, however, has several drawbacks. For example, the present technique often requires full emulation of the environment, including hardware emulation and Internet-level emulation. Further, such emulation may also be somewhat slow, since every piece of code is emulated. Still yet, differences in the simulated and real environment may lead to different emulated execution flows and potential misses. For example, improper emulation of a single unrelated operating system's application programming interface may change the execution flow, and the emulation may never reach a block of malicious code. Further, a program may read some data from files on other computers on a local area network (LAN)/Internet and change the execution flow, yet again failing to reach malicious code if such data is missing and/or invalid.

In the past, various techniques have been employed to address the foregoing drawbacks. For example, in the past, emulators were pointed to some particular key point in the computer, and then emulate the computer code just from such point. To this end, emulation only occurred with respect to particular portions of the computer code and only when such key point was found. This, in turn, resulted in a more efficient process.

There is thus a need for overcoming these and/or other problems associated with the prior art.

SUMMARY

A system, method, and computer program product are provided for detecting malware. In use, a search is conducted for known elements of computer code. Upon the detection of at least one known element of computer code, various operations are performed. In particular, the present technique steps back in the computer code, and emulates the computer code. Such emulation and stepping are performed for detecting malware.

DETAILED DESCRIPTION

Figure 1:
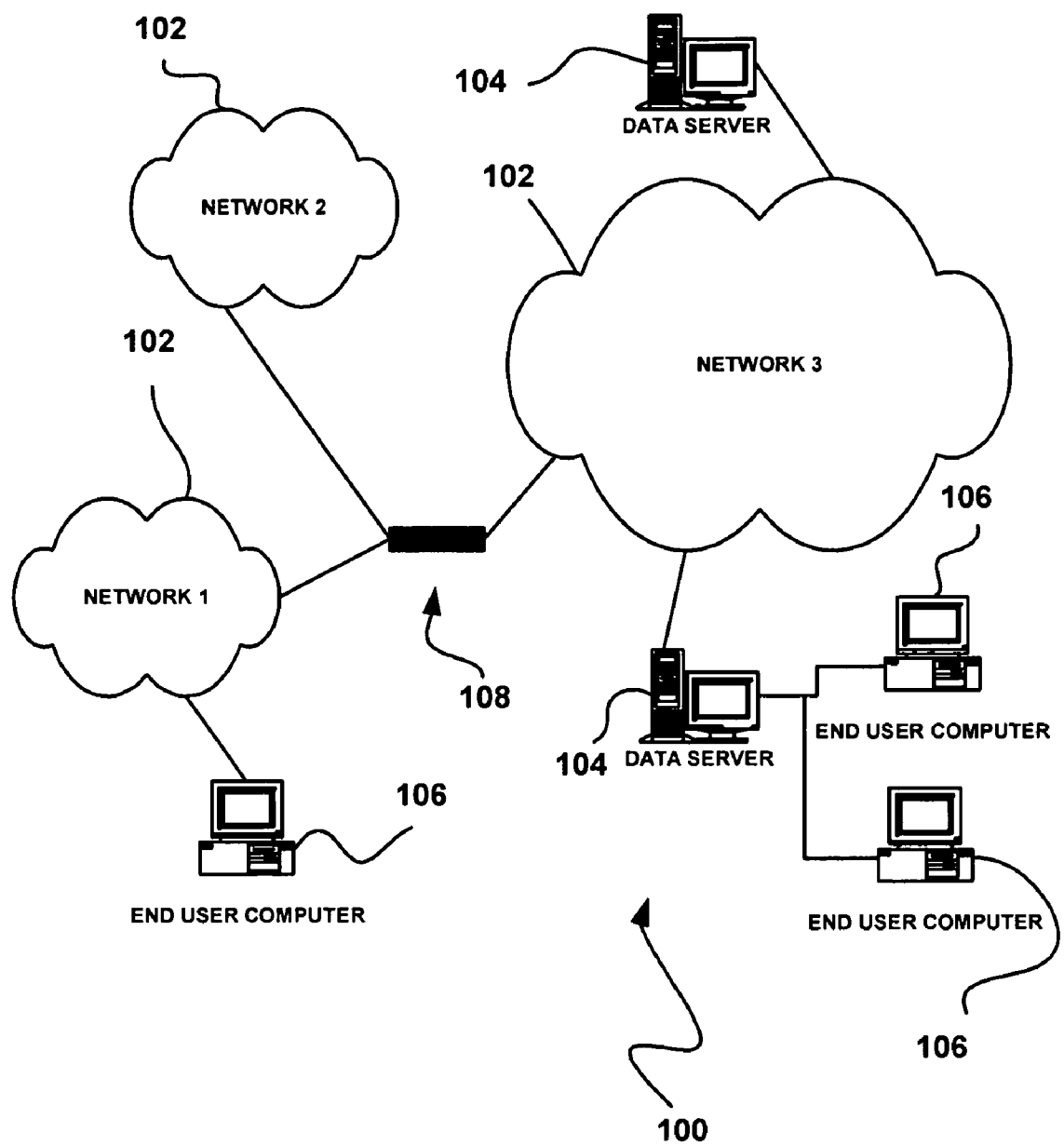
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, etc.

Coupled to the networks 102 are data server computers 104 which are capable of communicating over the networks 102. Also coupled to the networks 102 and the data server computers 104 is a plurality of end user computers 106. Such client computers 106 may each include a desktop computer, lap-top computer, mobile phone, hand-held computer, any component of a computer, and/or any other type of logic. In order to facilitate communication among the networks 102, at least one gateway or router 108 is optionally coupled therebetween.

It should be noted that any of the foregoing computers in the present network architecture 100, as well as any other unillustrated hardware and/or software, may be equipped with various security system features. For example, the various data server computers 104 and/or end user computers 106 may be equipped with security system hardware and/or software for emulating computer code in search of malware. More information regarding optional functionality and optional architectural components associated with such feature will now be set forth for illustrative purposes.

Figure 2:
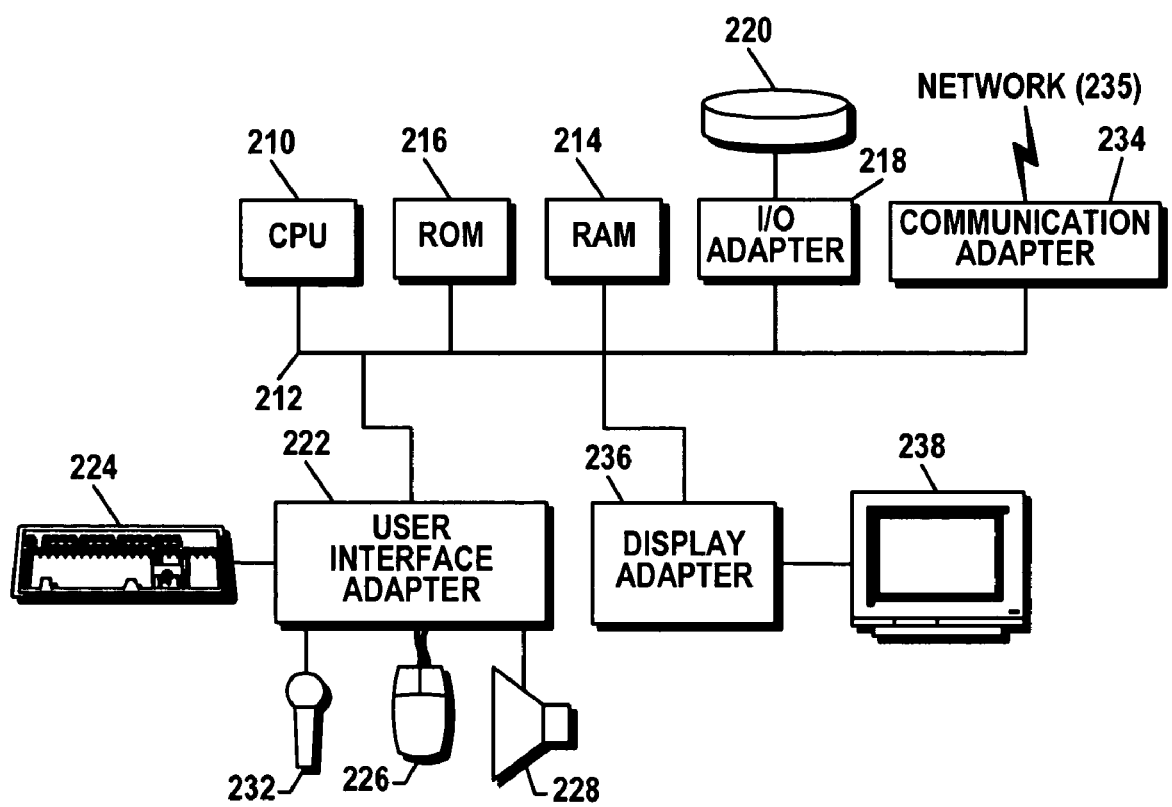
FIG. 2 shows a representative hardware environment that may be associated with the data server computers and/or end user computers of FIG. 1, in accordance with one embodiment.

FIG. 2 shows a representative hardware environment that may be associated with the data server computers 104 and/or end user computers 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Our course, the various embodiments set forth herein may be implemented utilizing hardware, software, or any desired combination thereof. For that matter, any type of logic may be utilized which is capable of implementing the various functionality set forth herein.

Figure 3:
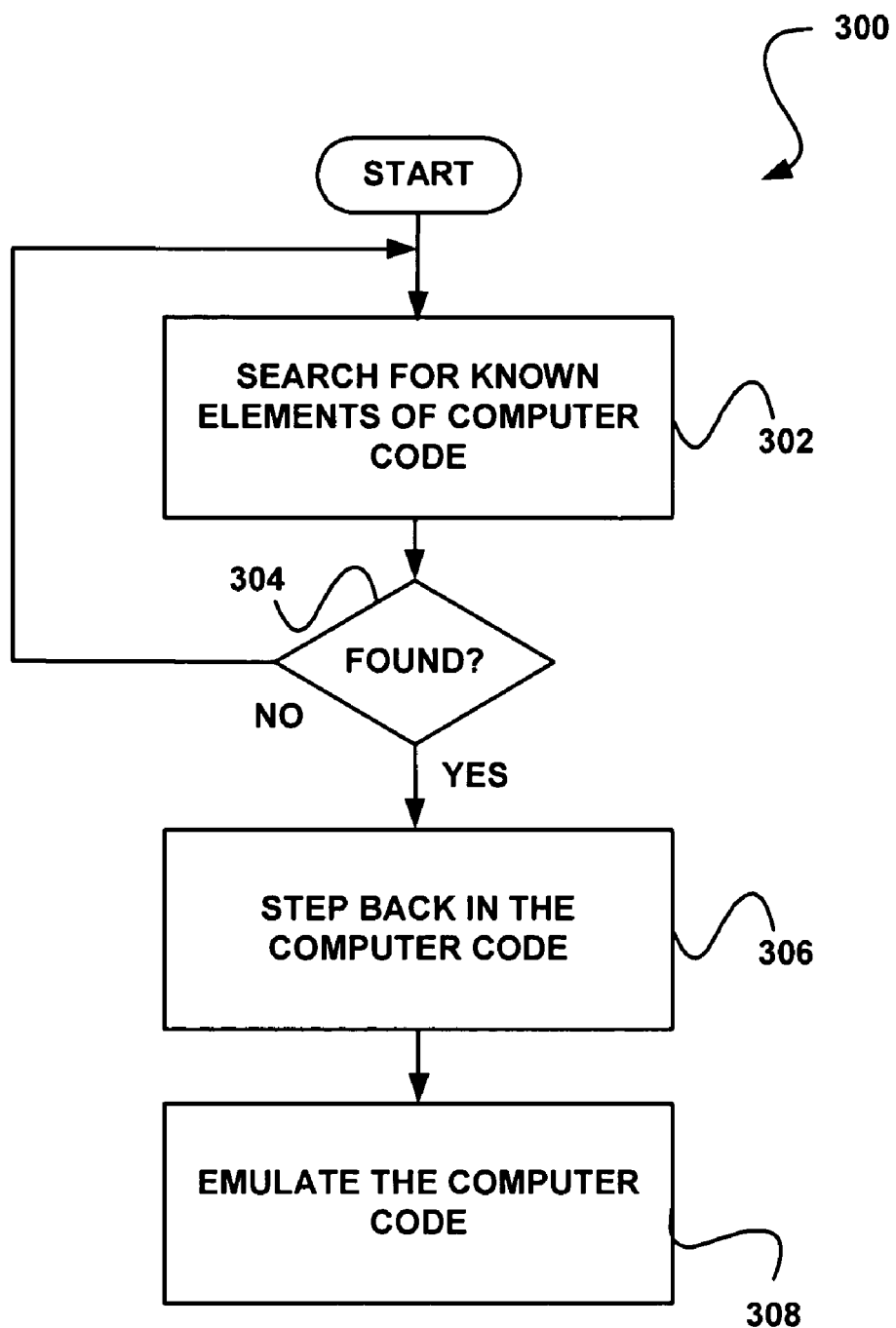
FIG. 3 shows a method for computer code emulation, in accordance with one embodiment.

FIG. 3 shows a method 300 for computer code emulation, in accordance with one embodiment. As an option, the present method 300 may be implemented in the context of the architecture and environment of FIGS. 1 and/or 2. Of course, however, the method 300 may be carried out in any desired environment.

As shown, a search is conducted for known elements of computer code. See operation 302. Such known elements may include application programming interface (API) calls (e.g. operating system API calls, etc.), dynamic link libraries (DLLs), static link libraries, any computer instructions (e.g. central processing unit instructions, etc.), and/or any other desired element (e.g. part, piece, component, etc.) of computer code that is both known before emulation and is capable of being located in the computer code. Further, it should be noted that the search may be conducted in any desired fashion that results in identification of the known elements in the computer code.

As an option, for reasons that will soon become apparent, such known elements of computer code may further be identified as those that are known to at least potentially be associated with malware. In the context of the present description, the malware may include any malicious data/code, such as viruses, worms, Trojan horses, spyware, unwanted programs, etc., and/or any other data and/or code that is unwanted.

During use, it is determined whether at least one of the known elements of computer code has been found. Note decision 304. Upon the detection of at least one known element of computer code, various operations are performed. In particular, in operation 306, the present method 300 steps back in the computer code.

To illustrate one example of stepping back, reference may be made to Table 1 below showing a plurality of computer code elements. In use, if Computer code element_4 is identified as one of the known elements of computer code, the aforementioned step back operation 306 may involve moving to a previous computer code element (e.g. Computer code element_3, Computer code element_2, etc.). Of course, the stepping in operation 306 may employ any other desired technique.

TABLE 1

Computer code element_1
Computer code element_2
Computer code element_3
Computer code element_4
Computer code element_5

To this end, in operation 308, the computer code may be emulated. In one embodiment, the emulation may involve execution of the computer code in a simulated environment that is insulated to the extent that any malicious actions resulting therefrom are incapable of causing any harm to hardware and/or software. It should be noted, however, that, in the context of the present description, such emulation may involve execution of any desired previous computer code element(s) provided for by way of the step back operation 306.

More illustrative information will now be set forth regarding various optional architectures and features with which the foregoing method 300 may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
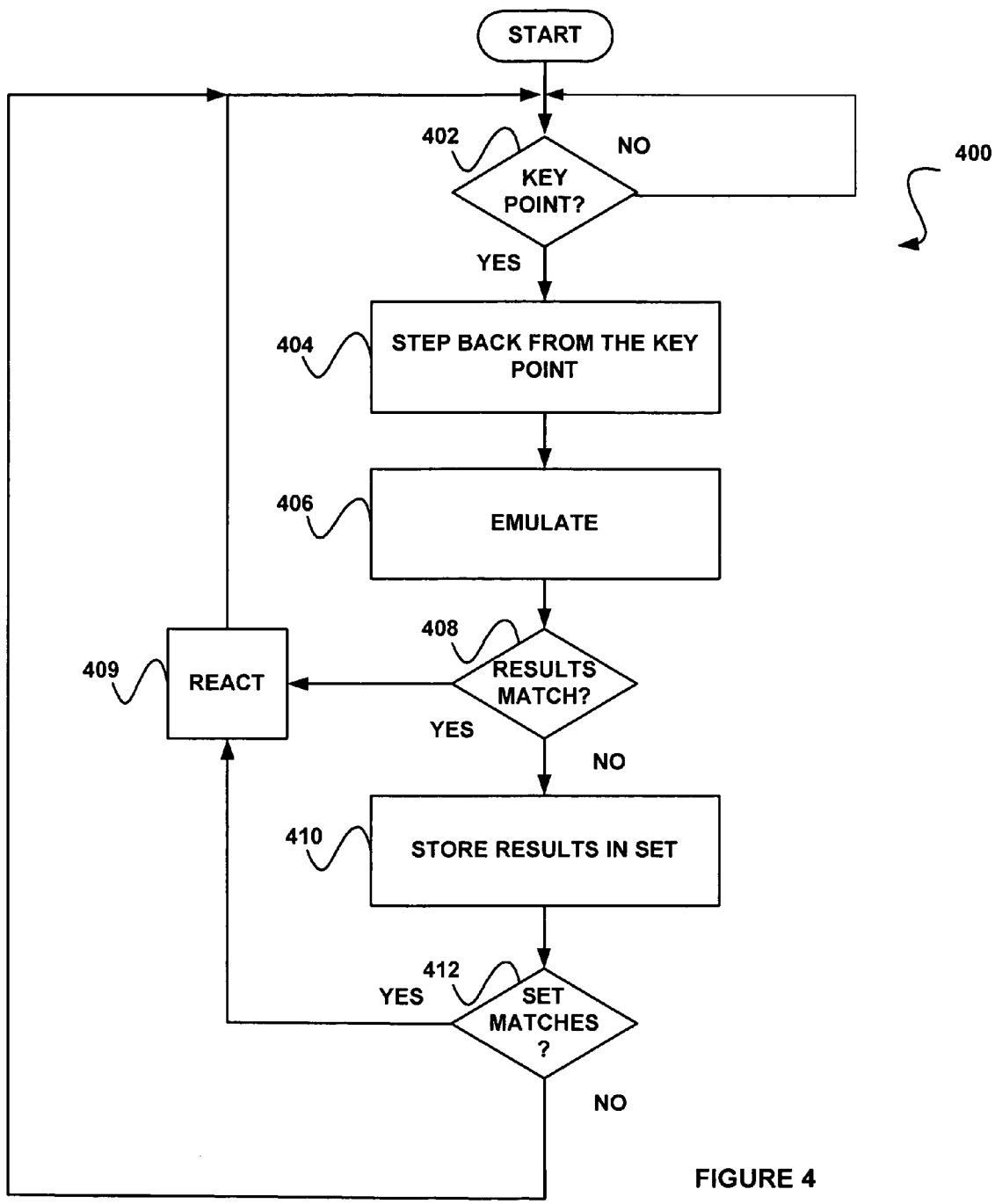
FIG. 4 shows an additional method for emulating computer code, in accordance with another embodiment.

FIG. 4 shows an additional method 400 for emulating computer code, in accordance with another embodiment. As an option, the present method 400 may be implemented in the context of the architecture and environment of FIGS. 1-3. Of course, however, the method 400 may be carried out in any desired environment.

Initially, in decision 402, it is determined whether a key point has been found in computer code. Such key point may, for example, refer to a known element of computer code and may be found, in one embodiment, by employing the operations 302-304 of the method 300 of FIG. 3. Still yet, more information regarding yet another exemplary technique for finding the key point will be set forth in greater detail during reference to FIG. 5.

Next, in operation 404, the present method 400 steps back in the computer code. This may be accomplished in any desired manner (e.g. it may vary in wide ranges and mostly depends on implementing architecture). For example, the present step back operation 404 may be accomplished in a manner similar to that of operation 306 of the method 300 of FIG. 3.

The method 400 then proceeds by emulating a portion of computer code in operation 406, as a function of the step back operation 404. For example, the emulation may be carried out on a portion of the computer code starting with a point defined by the stepping back and the key point. Specifically, the emulation may start at a point in the computer where the stepping back stopped, and then continue up until the key point.

As mentioned earlier, the key point may refer to a known element of computer code. Further, each key point may reflect computer code associated with a different set of potential malwares. To this end, an extent to which and/or manner in which the present method 400 steps back in the computer code may vary as a function of the specific key point identified in decision 402. Table 2 illustrates an example of a data structure that may be used for implementing such a feature.

TABLE 2

| | |
|---|---|
| Known computer code element_1 | Step back X elements (to find malware A) |
| Known computer code element_2 | Step back Y elements (to find malware B) |
| Known computer code element_3 | Step back Z elements (to find malware C) |

Thus, an amount of stepping back (and further emulation) may be minimized and limited to only that which is required to potentially identify a particular type of malware that may exist in light of a particular known computer code element. The foregoing dynamic step back feature is strictly an option. It is further contemplated that the step back operation 404 may be static in nature. For example, a number of code elements stepped back in operation 404 may be set to be large enough (e.g. 100-200 bytes, etc.) to accommodate the search for an entire known set of malwares.

In use, the emulation operation 406 produces various results. For example, such results may include various actions initiated by the computer code, as well as various parameters associated with execution of the computer code. Such parameters may even include parameters with which the execution of the computer code arrives at the key point (e.g. parameters on stack, pointers to memory and associated contents, etc.).

Results of the emulation may be compared with data in a database (e.g. malware database, etc.) including a plurality of signatures, patterns, heuristic data, rules, and/or any other data capable of being used to detect malware in emulated computer code. Thus, in decision 408, it may be determined whether results of the emulation match any component of the database, indicating that malware exists.

If such match is found in decision 408, an appropriate reaction may be initiated in operation 409. Such reaction may involve any cleaning, quarantining, deleting, reporting, logging, etc. that is deemed appropriate in response to the identification of malware. If, however, a match is not found in decision 408, the results of the emulation operation may be stored in a database. Note operation 410.

Thus, even if a match is not found with respect to a particular set of computer code elements, the results of the emulation may be used in combination with previously stored results in an effort to identify an aggregate match. Note decision 412. Again, if such match is found in decision 412, an appropriate reaction may be initiated in operation 409.

If no match is found in decisions 408 and 412, the various operations of the method 400 may be repeated in association with a plurality of the key points to generate a set of results. In the same way that the step back operation 404 may be dynamically tailored to accommodate a particular key point (and associated known computer code element), a portion of the database (and even a selection of a subset of available emulation-related operations, etc.) involved in the matching process of decisions 408 and 412 may also be tailored. By this feature, only pertinent components of the database are involved in the analysis, for further efficiency purposes. Of course, in various other embodiments, the entire database (and the emulations results) may be involved.

The present method 400 may thus provide for various options such as quicker emulation by relying on code-analysis to avoid some emulation. Further, it may be easier to emulate after stepping back since there may possibly be no need to support a full simulated environment and APIs of no interest. Still yet, the present method 400 may optionally be used to detect malware that does not receive control directly (e.g., a function residing in a DLL, a block of computer code unreachable via full emulation since external data driving execution flow is not available, etc.)

Figure 5:
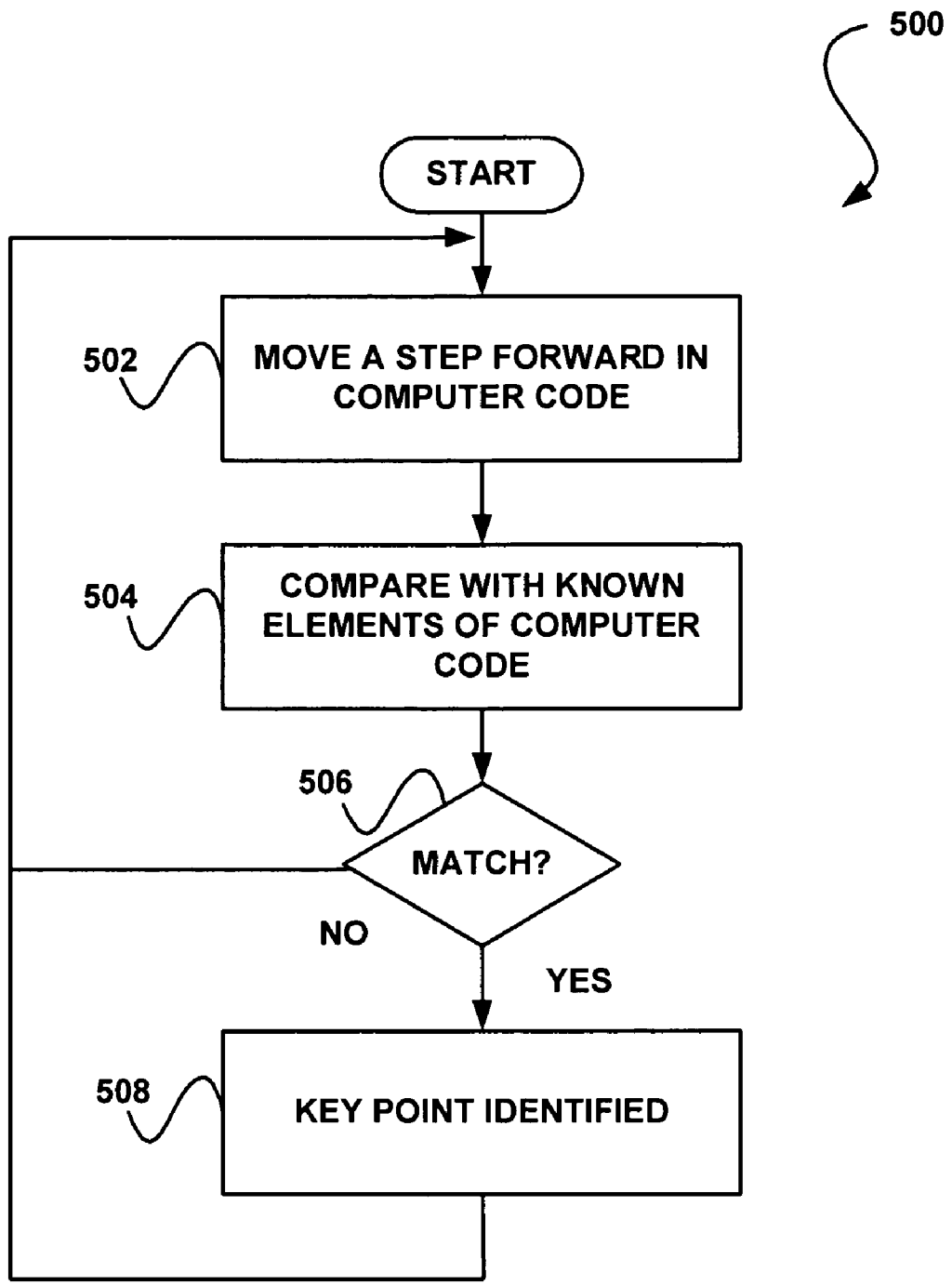
FIG. 5 illustrates a method for identifying a key point in computer code, in accordance with one embodiment.

FIG. 5 illustrates a method 500 for identifying a key point in computer code, in accordance with one embodiment. As an option, the present method 500 may be implemented in the context of the architecture and environment of FIGS. 1-4 and, in particular, decision 402 of FIG. 4. Of course, however, the method 500 may be carried out in any desired environment.

As shown, the method 500 may proceed step-by-step in the computer code. Note operation 502. At each element, such computer code element may be compared to a database of known computer elements. See operation 504. If it is determined that a match is found in decision 506, such computer code element is identified as a key point, and the appropriate emulation may be carried out in the manner set forth in FIG. 4. See operation 508. If, on the other hand, it is determined that a match is not found in decision 506, the method 500 may proceed step-by-step through the computer code.

It should be noted that a single computer element (or set of computer elements) may result in more than one match in operations 504-506. If more than one match is found, each computer element may be addressed via the method 400 of FIG. 4 as a separate key point, as an option.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A method, comprising:
   searching for known elements of computer code among a plurality of computer code elements including a first computer code element and a second computer code element subsequent to the first computer code element, the computer code elements including parts of the computer code and the known elements of the computer code including elements of the computer code that are both known before emulation and are capable of being located in the computer code;
   upon detection of the second computer code element including at least one known element of computer code,
      stepping back in the computer code by moving from the second computer code element to the first computer code element, and
      emulating the computer code as a function of the stepping back; detecting malware based on the emulation and the stepping;
   comparing results of the emulation with data in a database;
   wherein the results include parameters associated with execution of the computer code.

2. The method of claim 1, wherein the at least one known element of the computer code is identified as a key point in the computer code.

3. The method of claim 2, wherein the key point is associated with an application programming interface.

4. The method of claim 2, wherein the key point is associated with an operating system application programming interface.

5. The method of claim 2, wherein the stepping back occurs from the key point.

6. The method of claim 1, wherein the database includes a malware database.

7. The method of claim 2, wherein the parameters include parameters with which the execution of the computer code arrives at the key point.

8. The method of claim 2, and further comprising repeating the stepping and the emulation in association with a plurality of the key points to generate a set of results.

9. The method of claim 8, and further comprising comparing the set of results of the emulation with the data in the database.

10. The method of claim 1, wherein the stepping is performed prior to the emulation.

11. The method of claim 1, wherein the malware includes viruses.

12. The method of claim 1, wherein the malware is selected from the group consisting of malware, spyware, and unwanted programs.

13. The method of claim 1, wherein the stepping is minimized by the stepping back from a key point.

14. The method of claim 2, wherein the emulation is carried out on a portion of the computer code starting with a point defined by the stepping and the key point.

15. The method of claim 1, wherein the stepping reduces an amount of the computer code to be emulated.

16. The method of claim 2, and further comprising determining whether an additional key point exists, and repeating the stepping and the emulation in association with the additional key point.

17. A computer code embodied on a computer readable medium, comprising:
   a computer segment for searching for known elements of computer code among a plurality of computer code elements including a first computer code element and a second computer code element subsequent to the first computer code element, the computer code elements including parts of the computer code and the known elements of the computer code including elements of the computer code that are both known before emulation and are capable of being located in the computer code;
   a computer segment for, upon the detection of the second computer code element including at least one known element of computer code,
      stepping back in the computer code by moving from the second computer code element to the first computer code element, and
      emulating the computer code as a function of the stepping back;
   a computer segment for detecting malware based on the emulation and the stepping;
   a computer segment for comparing results of the emulation with data in a database;
   wherein the results include parameters associated with execution of the computer code.

18. A system, comprising:
   a processor coupled to memory,
      the processor adapted for searching for known elements of computer code among a plurality of computer code elements including a first computer code element and a second computer code element subsequent to the first computer code element, the computer code elements including parts of the computer code and the known elements of the computer code including elements of the computer code that are both known before emulation and are capable of being located in the computer code;
      the processor adapted for stepping back in the computer code by moving from the second computer code element to the first computer code element, and emulating the computer code as a function of the stepping back, upon the detection of the second computer code element including at least one known element of computer code;
      the processor adapted for detecting malware based on the emulation and the stepping; and
      the processor adapted for comparing results of the emulation with data in a database;
      wherein the results include parameters associated with execution of the computer code.

19. The method of claim 1, wherein the known elements of computer code include one or more of application programming interface (API) calls, dynamic link libraries (DLLs), static link libraries, and computer instructions.

20. The method of claim 1, wherein the stepping back involves moving to a previous computer code element.

21. The method of claim 7, wherein the parameters with which the execution of the computer code arrives at the key point include parameters on a stack and pointers to memory and associated contents.

* * * * *